United States Patent [19]

Herzl et al.

[11] 4,033,189

[45] July 5, 1977

[54] EXTERNAL-SENSOR VORTEX-TYPE FLOWMETER

[75] Inventors: Peter J. Herzl, Morrisville; Harold W. Metzger, Willow Grove, both of Pa.

[73] Assignee: Fischer & Porter Co., Warminster, Pa.

[22] Filed: Mar. 26, 1976

[21] Appl. No.: 670,998

[52] U.S. Cl. .......................................... 73/194 VS
[51] Int. Cl.² ........................................ G01F 1/32
[58] Field of Search ............ 73/194 B, 194 VS, 228

[56] References Cited

UNITED STATES PATENTS

| | | | |
|---|---|---|---|
| 1,935,445 | 11/1933 | Heinz | 73/194 |
| 2,809,520 | 10/1957 | Richard, Jr. | 73/194 X |
| 3,530,714 | 9/1970 | Akeley | 73/228 |
| 3,541,854 | 11/1970 | Jones et al. | 73/228 |
| 3,888,120 | 6/1975 | Burgess | 73/194 |
| 3,946,608 | 3/1976 | Herzl | 73/194 |

*Primary Examiner*—Herbert Goldstein

[57] ABSTRACT

A vortex-type flowmeter having a flow tube forming a conduit for the fluid to be metered and an obstacle assembly mounted therein capable of generating fluidic oscillations. These oscillations cause a deflectable section of the assembly which is cantilevered by a flexible beam from a fixed section mounted across the tube to vibrate at a corresponding frequency proportional to flow rate. These vibrations are mechanically transmitted to a coupling point outside the flow tube, whereby the flow rate may be read by means of an external force sensor engaging the coupling point. Vibration transmission is effected by a rod secured at one end to the deflectable section and passing through a bore in the flexible beam to join a probe which extends at right angles thereto. The probe is disposed within a bore in the fixed section and projects through an opening in the flow tube wall to terminate in the outside coupling point. The probe is held by a flexible diaphragm covering the flow tube opening and acting as a fulcrum, the outside portion of the probe being short in length relative to the inside portion, whereby the resultant lever affords mechanical advantage to amplify the force applied by the coupling point to the force sensor.

8 Claims, 5 Drawing Figures

EXTERNAL-SENSOR VORTEX-TYPE FLOWMETER

RELATED APPLICATION

This application is related to a copending Herzl application Ser. No. 445,869, filed Feb. 26, 1974, entitled "Vortex Flowmeter with External Sensor." Now U.S. Pat. No. 3,946,608.

BACKGROUND OF INVENTION

The invention relates generally to vortex-type flowmeters which act to convert fluidic oscillations to corresponding mechanical vibrations which are transmitted to an outside coupling head engaged by an external force sensor whose signal is indicative of the flow rate of the fluid being metered, and more particularly to a flowmeter arrangement in which the mechanical vibrations are amplified in the course of transmission to increase the signal level of the sensor and to improve the frequency response of the sensing system.

Artificial life expedients are often required to increase oil recovery at oil well sites. One widely used form of secondary recovery is the water-flood technique wherein pressurized water is forced through an injection well adjacent the site of the producing well, the injected water flooding the oil bearing region and providing the necessary pressure for oil extraction.

In a secondary recovery system, oil intermingled with water is yielded by the producing well. The water is thereafter separated from the oil and is returned to injection pumps delivering water to several injection wells, so that the secondary recovery system involves a network of water lines leading to a group of functioning wells. Waterflood techniques are also currently in use in uranium mining.

In maintaining and servicing a waterflood system, it is necessary to periodically check the water flow rate at various points in the water line network. The present practice is to effect measurement by means of turbine meters installed in the water lines. In the conventional turbine meter, the turbine rotor is mounted within the flow conduit, a permanent magnet being incorporated in the rotor. The rotating magnet induces an alternating-current in a pick-up coil located in the external housing of the meter, the frequency of the generated signal being proportional to the volumetric flow rate. The frequency of the signal is converted into a reading of flow rate.

Since turbine meters are relatively expensive, and a waterflood system requires a large number of such meters, one recent innovation has been to omit the pick-up coil from the meter and to provide a separate pick-up coil coupled to a battery-operated test set which affords a flow rate reading. This practice is feasible since it is only occaionally necessary for an operator to check flow rate at the meter installation and then, if necessary, to make a manual valve adjustment to correct flow rate. Thus the operator who carries the pick-up coil and the test set makes a tour of the various turbine meter installations to check the flow rate.

The main drawback of turbine flowmeters in the context of a waterflood system is that because it has a rotor which is exposed to the water, there is a reliability problem, in that the water being measured is often dirty and tends to foul and degrade the rotor and its bearings, particularly if the water contains abrasive particles and corrosive chemical constituents. Hence after prolonged use, the turbine meter may become inoperative or inaccurate.

In the above-identified copending application, there is disclosed a vortex-type flowmeter adapted to operate in conjunction with an external sensor coupled to a portable digital read-out device whereby the same external system may be used to take readings from a large number of installed flowmeters. The installed flowmeters are therefore altogether devoid of electrically-powered devices so that no danger exists in environments that cannot tolerate unattended electrical circuits.

The flowmeter disclosed in the copending application includes a flow tube forming a passage for the fluid to be metered and an obstacle assembly disposed in the tube and capable of generating strong fluidic oscillations which cause a deflectable section of the assembly to vibrate at a corresponding rate, the deflectable section being cantilevered by a flexible beam from a fixed section. Disposed within the beam is a rod which is caused to vibrate at the same rate as the deflectable system, the rod vibration being transferred to a probe placed within a passage in the fixed section of the obstacle assembly and extending to the exterior of the tube, whereby the vibrations of the deflectable section within the flow tube are transmitted to the exterior thereof.

The probe extension terminates in a coupling head outside the flow tube which is engageable by a force sensor adapted to convert the probe vibration into an electrical signal whose amplitude is proportional to the applied force and whose frequency is a function of flow rate. The force sensor is coupled to a test set serving to convert the signal into a flow rate reading. Such meters will hereinafter be referred to as external-sensor vortex-type flowmeters.

In the vibration transmission arrangement disclosed in the copending Herzl application, one end of the probe is anchored, the probe passing through a bore in the fixed section of the obstacle assembly and then through an opening in the wall of the flow tube, the other end of the probe terminating in the outside coupling head. The vibrating rod which is at right angles to the probe is linked thereto at a junction point intermediate the coupling head and the anchor point, whereby the probe is caused by the vibrating rod to swing about the anchor point acting as a fulcrum.

The force exerted on the force sensor by the coupling head and the amplitude of the resultant signal depends on the mechanical advantage afforded by the probe of the vibration transmitter. Mechanical advantage represents the ratio of the force exerted by a device to the force acting on it. Thus if the handle of an automobile jack is moved 1 inch in lifting a car 0.002 inch, the mechanical advantage is 500. In the present context, the larger the mechanical advantage, the greater the amplification of the applied force applied to the sensor.

In the vibration transmitter, the probe functions as a lever, one arm of which is that portion of the probe which extends between the junction point of the rod and probe at which a force is applied (rod arm), the other arm being the remaining portion of the probe extending between this junction point and the coupling head (coupling head arm). The mechanical advantage of a lever is determined by the ratio of its arms, and since in the vibration transmitter disclosed in the copending Herzl application, the rod arm is somewhat shorter than the coupling head arm, the mechanical advantage is less than 1.

As a consequence, the force exerted by the coupling head on the force sensor is less than the force derived from the deflectable section and applied to the probe. The amplitude of the resultant sensor signal is therefore quite low. Because of this low level sensor signal, the signal-to-noise ratio is unfavorable and the system associated with the sensor has a frequency response which is less than satisfactory.

SUMMARY OF INVENTION

In view of the foregoing, it is the main object of this invention to provide an improved external sensor vortex-type flowmeter which generates a high-level sensor signal and having a good frequency response throughout its operating range.

More particularly, it is an object of this invention to provide a flowmeter of the above-type in which a vibrating deflectable section of the obstacle assembly in the flow tube is linked by a vibration transmitter to an outside coupling head to be engaged by a force sensor, the transmitter acting to amplify the force exerted by the coupling head on the sensor.

Yet another object of this invention is to provide a vibration transmitter in which the rod which is coupled at one end to the vibrating deflectable section of the obstacle assembly is coupled at the other end to a probe leading to the coupling head, the probe acting as a lever whose fulcrum is adjacent to the coupling head, whereby the probe has a mechanical advantage acting to amplify the force exerted by the head on the force sensor.

Briefly stated, these objects are attained in a vortex-type flowmeter having an obstacle assembly disposed within a flow tube to produce fluidic oscillations which excite into vibration a deflectable section of the assembly cantilevered from a fixed section mounted across the tube at a frequency which is a function of the flow rate of fluid conducted through the tube.

The vibratory action of the deflectable section is conveyed to an outside coupling head which is engageable by a force sensor by a transmitter constituted by a rod coupled to the deflectable section, the rod extending through a longitudinal bore in the beam and terminating at a probe. The probe extends through a longitudinal bore in the fixed section and projects through an opening in the wall of the flow tube to terminate at the coupling head adjacent the wall.

The probe is held by a flexible diaphragm which covers the opening in the tube wall and serves as a fulcrum, whereby the probe functions as a lever whose arm outside the flow tube is short relative to the arm within the tube whereby the mechanical advantage afforded by the probe acts to amplify the force exerted by the coupling head on the sensor to produce a high level sensor signal indicative of flow rate.

OUTLINE OF DRAWING

For a better understanding of the invention as well as other objects and further features thereof, reference is made to the following detailed description to be read in conjunction with the accompanying drawings, wherein.

Figure 4:
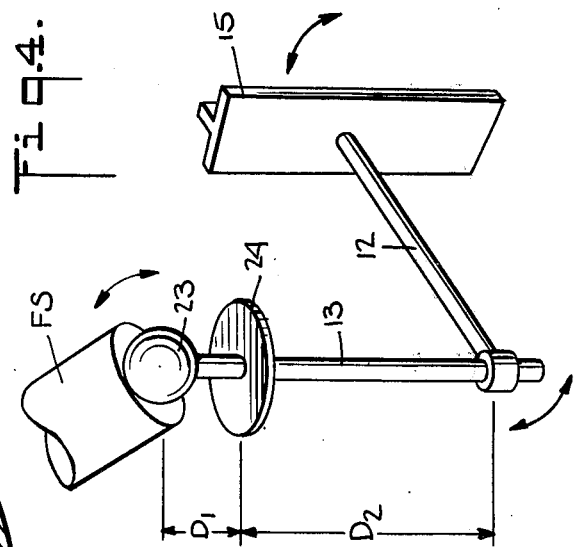
Figure 3:
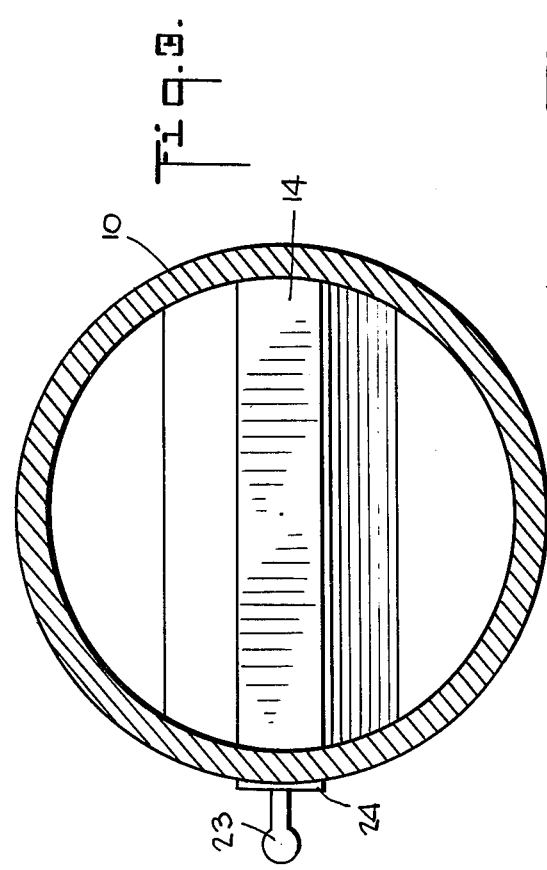
FIG. 3 is a front view of the meter.

FIG. 4 separately shows the vibration transmitter; and

Figure 1:
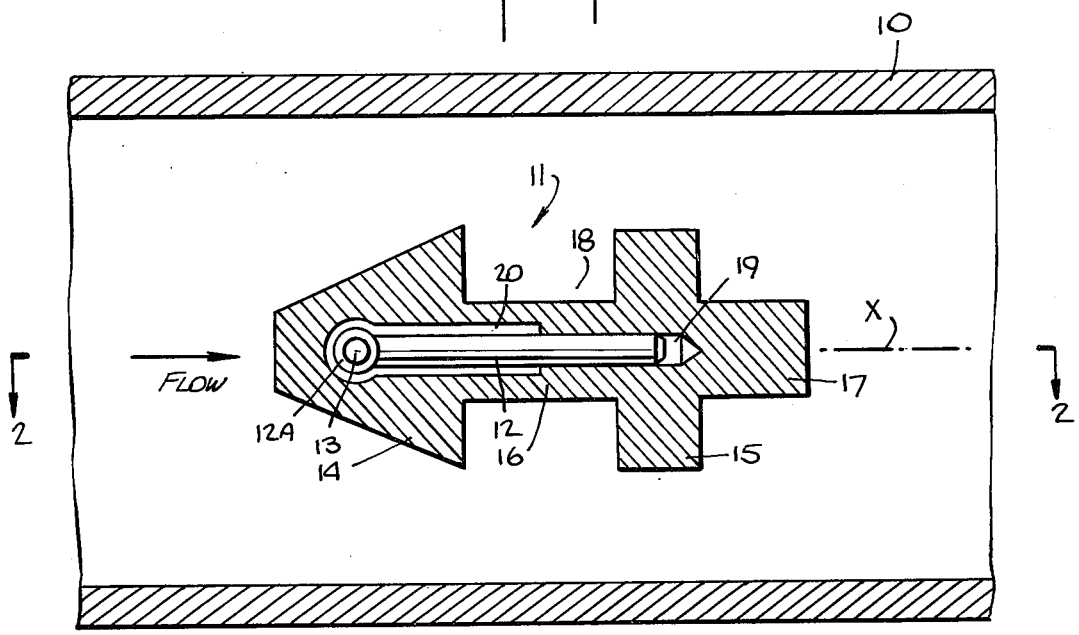
FIG. 1 is a longitudinal section taken through an external-sensor vortex flowmeter including a vibration transmitter in accordance with the invention.
Figure 2:
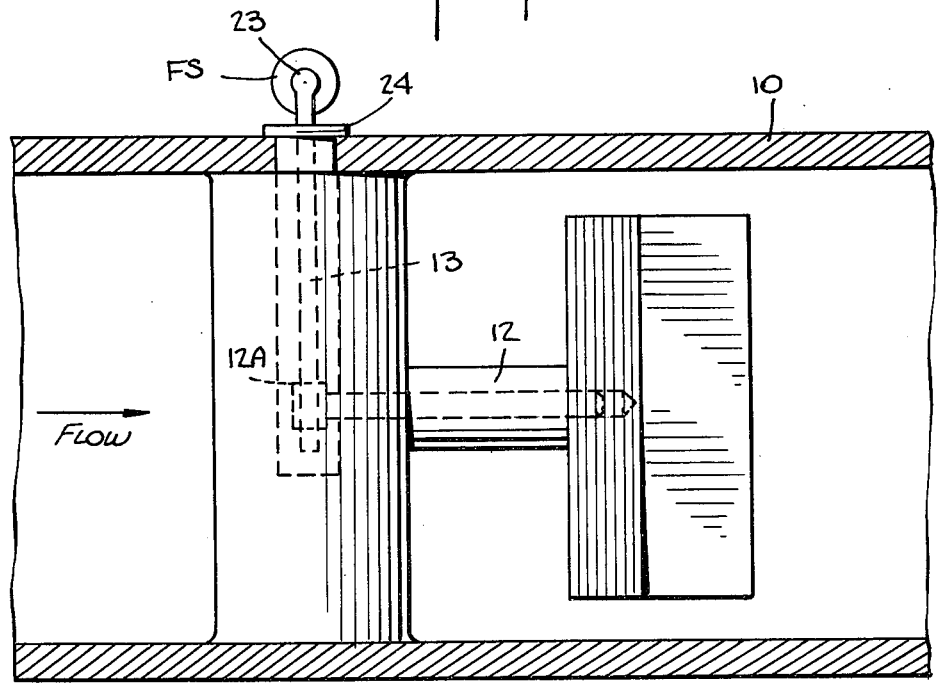
FIG. 2 is a section taken through the meter shown in FIG. 1 in the plane indicated by line 2—2 in FIG. 1.
Figure 5:
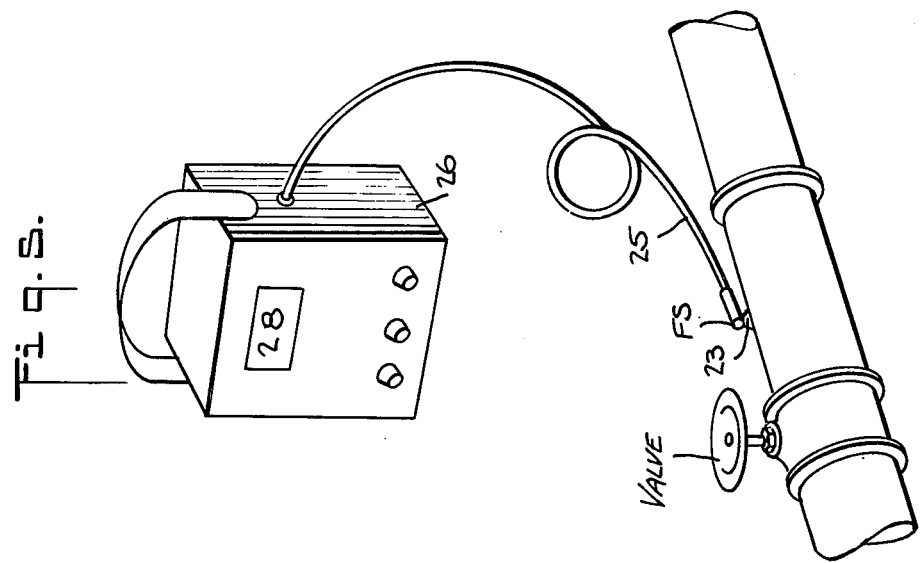

FIG. 5 schematically illustrates a flowmeter installation being tested by an external sensor whose output is coupled to a flow rate indicator.

DESCRIPTION OF INVENTION

In the vortex-type flowmeter of the type disclosed in the Herzl U.S. Pat. No. 3,867,839, there is provided an obstacle assembly adapted to generate strong stabilized fluidic oscillations causing a deflectable section of the assembly to vibrate at a corresponding rate. These mechanical vibrations are sensed to produce a signal whose frequency is proportional to the flow rate of the fluid. In the flowmeter disclosed in this patent, the mechanical vibrations are sensed by one or more strain gauges mounted within the deflectable section to produce periodic changes in electrical resistance, resulting in a signal whose frequency is proportional to the vibratory rate and hence to the flow rate of the fluid.

In the present invention, a similar obstacle assembly is employed, but the vibration of the deflectable section are detected by a force sensor which is external to the assembly.

This arrangement is shown in FIGS. 1 to 4 wherein a flowmeter in accordance with this invention includes a flow tube 10 interposed in the water line for a waterflood system or in any other environment in which it is necessary to conduct an occasional test of flow rate to determine whether proper flow conditions exist. For this purpose, the flow tube may be provided with end flanges to facilitate coupling to the line.

Mounted within flow tube 10 is an obstacle assembly generally designated by numeral 11, the assembly including a deflectable section which is responsive to the Karman vortex street and is caused to vibrate microscopically at a frequency which is proportional to flow rate. Incorporated in the obstacle assembly is a vibration transmitter composed of a rod 12 and a probe 13.

Flow tube 10, which is shown as having a circular cross-section but which may be in other cross-sectional forms, includes an inlet 10A into which the water to be metered is introduced. The flow impinges on obstacle assembly 11 which acts to divide the flow around the obstacle, producing fluidic perturbations in the form of a Karman vortex street. Obstacle assembly 11 is constituted by a transversely-mounted front section 14 and a rear section 15 mounted behind the front section by a cantilever support in the form of a flexible web or beam 16. Extending downstream from rear section 15 is a tail 17.

Front section 14 is a contoured block having a triangular or delta-shaped cross-section which is uniform throughout the long axis of the block, this axis being perpendicular to the flow axis X of the flow tube. The extremities of the front section are secured to the wall of the tube whereby the front section is held fixedly within the tube. The apex of block 16 faces the incoming fluid, the inclined sides thereof forming leading edges which are swept by the fluid flow to create vortices.

Rear section 15 takes the form of a non-streamlined body having a rectangular cross-section which is maintained by web 16 in spaced relation to the front section, the plane of the rear section being parallel to the flat base of the front section. The rear section shape is such as to interfere with the vortex street, and the gap 18 established between the front section block and the rear section tends to trap the vortices and to strengthen and stabilize the vortex street produced thereby.

Because rear section 15 is cantilevered by means of flexible beam 16, it is deflectable. The beam, though bendable, has sufficient rigidity so as to permit only a slight deflection of the rear section. As a consequence of the fluidic oscillations produced within the flow tube, the deflectable rear section 15 is excited into vibration at a rate corresponding to the frequency of the oscillations.

The natural resonance of the deflectable rear section is such as to be well outside the normal frequency range of the meter whereby mechanical resonance peaks are absent and the amplitude of the vibrating motion accurately reflects the amplitude of the fluidic oscillations. This vibratory motion is enhanced by tail 17. The downstream section of the assembly carries out two functions, for this section which interferes with the wake not only stabilizes it to enhance its detectability, but its vibratory motion gives rise to the output signal.

Because the deflectable system is relatively rigid, the total excursion of the rear section is minute even at the highest amplitudes of fluidic ocillation, so that metal fatigue of the supporting web, as a result of the vibrating action, is minimized and failures do not arise after prolonged operation.

It is important to note that the magnitude of deflection is not of primary importance, for the flow rate information is given by the frequency, not the amplitude of vibration. Hence while the deflection magnitude is made extremely small in order to provide an acceptable fatigue life, this does not militate against a readable output of varying frequency.

The minute vibrations of the deflectable rear section of the obstacle assembly are sensed outside of flow tube 10 rather than within the tube. For this purpose, the vibrations are conveyed by the vibration transmitter, including rod 12, whose rear portion is socketed within a bore 19 within deflectable section 15. The front portion of rod 12 lies freely within a relatively large diameter, longitudinally-extending bore 20 communicating with the smaller diameter bore 19 and extending well into front section 14.

Rod 12 terminates in a collar 12A which encircles the end portion of probe 13 to provide a link between the rod and the probe. In practice, this link may be effected in the manner disclosed in the Herzl copending application only when the force sensor is pressed against the coupling head. Probe 13 extends through a longitudinal passage in front section 14 and projects through an opening in the wall of flow tube 10 which is covered by a flexible diaphragm 24.

Any force sensor FS capable of responding to a force developed at coupling head 23 to produce a corresponding electrical signal may be used to provide a signal indicative of flow rate. A preferred sensor for this purpose is a quartz piezoelectric load cell, such as the "Piezotron" load cell (922 series) manufactured by Kistler Instrument Company of Redmond, Wash. This is a very stiff, rugged force sensor responsive to minute incremental forces and usable in environments contaiminated by dust, dirt or moisture without any adverse effect on signal transmission.

The output of vibration sensor FS is connected, as shown in FIG. 5, by a cable 25 to a portable test set 26 wherein the output is converted into a digital signal and applied to a suitable indicator 27 to provide a flow rate reading.

Thus, an operator equipped with a force sensor and test set can readily check flow rate simply by pressing the sensor to the exposed coupling head 23 of the vortex meter installed in the water line. And using the same equipment, the operator can take readings at all other vortex meter installations. Since the installed meter has no moving parts, it presents no reliability problem and can be depended on to provide accurate readings at all times.

The relationship between the vibration transmitter formed by rod 12 and probe 13 and sensor 25 engaging the coupling head is schematically illustrated in FIG. 4. It will be seen that probe 13, which is caused to vibrate by rod 12 linked thereto by collar 12A, swings back and forth about the fulcrum defined by diaphragm 24. Probe 13 acts as a lever, one arm of which (the rod arm) is defined by the portion of the probe extending between the fulcrum and the junction point of probe 13 and rod 12. The other arm (the coupling head arm) of the lever is defined by the portion of the probe between the fulcrum and the coupling head.

Since coupling head 23 is relatively close to the fulcrum, the length $D_1$ of the coupling head arm is short, as compared to the length $D_2$ of the rod arm. Inasmuch as the mechanical advantage is equal to $(D_2/D_1)$, the mechanical advantage of the lever configuration shown with the figures is about 3.

As a consequence, the force exerted by coupling head 23 on sensor FS is amplified and is greater than the force applied by the deflectable section to the probe 13 through rod 12. Since the force sensor is very stiff, there is little or no motion at its point of engagement with coupling head 23. The resultant force signal has a relatively high level, as compared to that produced in the prior Herzl arrangement in which the exerted force is reduced rather than amplified by the vibration transmitter. Hence with the present structure, the signal-to-noise ratio and frequency response of the sensing system is enhanced. Also, by properly balancing the probe about the fulcrum, the immunity of the structure to acceleration forces can be improved.

While there has been shown and described a preferred embodiment of an external-sensor vortex-type flowmeter in accordance with the invention, it will be appreciated that many changes and modifications may be made therein without, however, departing from the essential spirit thereof.

We claim:

1. A vortex-type flowmeter operable with an external force sensor and comprising:
   A. a flow tube through which a fluid to be metered is conducted;
   B. an obstacle assembly disposed in said tube to create fluidic oscillations therein, said assembly being constituted by a fixed section mounted across the tube and a deflectable section cantilevered from the fixed section by a flexible beam whereby said deflectable section is excited into vibration by said fluidic oscillations at a frequency which is a function of flow rate; and
   C. means to transmit the vibration from the deflectable section to a coupling head outside said tube which is engageable by a force sensor to generate a sensor signal whose amplitude depends on the force applied thereto and whose frequency is indicative of flow rate, said transmission means having a mechanical advantage effecting force amplification whereby said signal has a relatively high level, said vibration transmission means being constituted by a lever attached at one end to said coupling head and pivoted about fulcrum to cause said head to exert an amplified force on said sensor, the vibrations of said deflectable section being applied to said lever at a point adjacent the other end thereof, said head being relatively close to said fulcrum.

2. A flowmeter as set forth in claim 1, wherein said deflectable section is to the rear of said fixed section in said flow tube.

3. A flowmeter as set forth in claim 2, wherein said deflectable section is provided with a tail.

4. A flowmeter as set forth in claim 1, wherein said lever is a probe extending through a bore in said fixed section and protruding through an opening in the wall of the flow tube to terminate in said outside coupling head which is adjacent said tube wall, said opening being covered by a flexible diaphragm which surrounds and hinges said probe to function as said lever fulcrum.

5. A flowmeter as set forth in claim 4, wherein the vibrations are applied to said probe by a rod passing through a bore in said beam, one end of the rod being coupled to said deflectable section and vibrating therewith, the other end of the rod being coupled to said probe at a junction point whose distance from said fulcrum is greater than the short distance between said fulcrum and the coupling head.

6. A flowmeter as set forth in claim 5, wherein said force sensor is relatively stiff, so that the vibration of the coupling head is resisted thereby.

7. A flowmeter as set forth in claim 5, wherein the ratio of the greater distance to the short distance is at least 3 to 1.

8. A flowmeter as set forth in claim 6, wherein said force sensor is a piezoelectric element.

* * * * *

UNITED STATES PATENT OFFICE
CERTIFICATE OF CORRECTION

Patent No. 4,033,189　　　　　　　　Dated July 5, 1977

Inventor(s) Peter J. Herzl and Harold W. Metzger

It is certified that error appears in the above-identified patent and that said Letters Patent are hereby corrected as shown below:

Column 1, line 22 "life" should have read -- lift --

Column 4, line 22, "vibration" should have read -- vibrations --

Column 5, line 5 "a" should have read -- as -- line 23 "ocillation" should have read -- oscillation -- line 62 "taiminated" should have read -- taminated --

Column 7, line 3 before "fulcrum" -- a -- should have been inserted.

*Signed and Sealed this*

*First* Day of *November 1977*

[SEAL]

*Attest:*

RUTH C. MASON　　　　　　LUTRELLE F. PARKER
*Attesting Officer*　　　*Acting Commissioner of Patents and Trademarks*